United States Patent
Patten et al.

(10) Patent No.: US 7,061,552 B1
(45) Date of Patent: Jun. 13, 2006

(54) METHOD AND APPARATUS TO PERFORM AUTOMATIC DIGITAL CONVERGENCE

(75) Inventors: Chris Warren Patten, New Stanton, PA (US); Toshiyuki Kawashima, North Huntingdon, PA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 09/493,917

(22) Filed: Jan. 28, 2000

(51) Int. Cl.
  *H04N 3/26* (2006.01)
  *H04N 5/46* (2006.01)
  *H04N 7/01* (2006.01)
  *H04N 11/20* (2006.01)

(52) U.S. Cl. ............... 348/806; 348/445; 348/556; 348/558; 348/747; 345/660

(58) Field of Classification Search ............... 348/445, 348/556, 558, 745, 747, 806, 807, 913; 345/121, 345/660, 684; H04N 3/26, 5/46, 7/01, 11/20
See application file for complete search history.

(56) References Cited

U.S. PATENT DOCUMENTS

| | | | | |
|---|---|---|---|---|
| 4,593,308 A | * | 6/1986 | Kemplin | 348/189 |
| 5,111,284 A | * | 5/1992 | Tsujihara et al. | 348/747 |
| 5,459,825 A | * | 10/1995 | Anderson et al. | 345/815 |
| 5,473,224 A | * | 12/1995 | Tsujihara et al. | 315/368.18 |
| 5,521,658 A | * | 5/1996 | Donohoe | 353/98 |
| 5,537,149 A | * | 7/1996 | Teraoka et al. | 348/132 |
| 5,699,123 A | * | 12/1997 | Ebihara et al. | 348/445 |
| 5,737,123 A | * | 4/1998 | Donohoe | 348/836 |
| 5,917,549 A | * | 6/1999 | Simons et al. | 348/441 |
| 5,923,366 A | * | 7/1999 | Kawashima et al. | 348/190 |
| 5,956,091 A | * | 9/1999 | Drewery et al. | 348/445 |
| 6,057,881 A | * | 5/2000 | Kawashima et al. | 348/181 |
| 6,100,926 A | * | 8/2000 | Kawashima | 348/181 |
| 6,262,772 B1 | * | 7/2001 | Shen et al. | 348/173 |
| 6,323,915 B1 | * | 11/2001 | Marflak et al. | 348/173 |
| 6,366,706 B1 | * | 4/2002 | Weitbruch | 348/441 |
| 6,525,778 B1 | * | 2/2003 | Suzuki | 348/556 |
| 6,650,321 B1 | * | 11/2003 | Lee | 345/204 |
| 6,750,921 B1 | * | 6/2004 | George | 348/745 |

\* cited by examiner

*Primary Examiner*—Brian P. Yenke
(74) *Attorney, Agent, or Firm*—Mayer & Williams PC; Karin L. Williams, Esq.

(57) ABSTRACT

A method and apparatus for performing autoconvergence is described. An image having a first aspect ratio and a plurality of sides is received. The image is displayed on a display having a second aspect ratio and at least one sensor corresponding to each side of the image. The image is moved so that each sensor can detect the corresponding side of the image.

19 Claims, 5 Drawing Sheets

METHOD AND APPARATUS TO PERFORM AUTOMATIC DIGITAL CONVERGENCE

FIELD OF THE INVENTION

The invention relates to image devices in general. More particularly, the invention relates to a method and apparatus for performing automatic convergence on a cathode ray tube (CRT) display used in an image display device such as a television.

BACKGROUND OF THE INVENTION

The presentation of moving images on a display has been a popular medium of communication for many years. As a result, many innovations have evolved to make movies and films capable of reproducing the visual and audible depth, robustness and acuity of the human senses. For example, digital image processing and communication techniques are capable of producing images and movies of exceptional high quality.

As with many industries, the evolution of technologies presents problems, particularly with respect to transitioning from an older technology to a newer technology. For example, in the wireless communications industry, much of the existing infrastructure and cellular telephones were designed to carry analog signals. Due to quality and capacity issues, digital systems and digital cellular telephones were designed. Since development of an entirely new digital system would take a number of years, however, an interim cellular telephone was developed that was capable of communicating using both analog and digital signals (sometimes referred to as "dual-mode" telephones).

The television industry is currently facing a similar problem. In particular, the television industry is presently transitioning from an existing video standard referred to as the National Television Systems Committee (NTSC) standard or the Electronic Industries Association (EIA) standard RS-170A developed in the late 1940s to the High Definition Television (HDTV) standard finalized in the early 1990s. A video signal "standard" specifically prescribes a video signal's synchronization timing, electrical voltage levels, and quality measures.

As a result, many television manufacturers are now developing televisions that are cable of displaying the present NTSC standard signals as well as the new HDTV standard signals. One key difference between these two standards, however, is the aspect ratio. The term "aspect ratio" refers to the dimensions of an image or picture which is calculated by dividing the image's horizontal width by its vertical height. In the present NTSC standard, the aspect ratio is a "4:3" aspect ratio, where 4 is the horizontal dimension and 3 is the vertical dimension. In other words, the horizontal dimension of the image is 1.33 times wider than the vertical dimension. By way of contrast, the HDTV standard calls for a "16:9" aspect ratio. When a 16:9 aspect picture is displayed on a 4:3 aspect ratio television, the horizontal width of the 16:9 aspect picture matches the horizontal width of the 4:3 aspect ratio television, but not the vertical height. Consequently, black bands appear at the top and bottom of the television screen. This is sometimes referred to as a "letterbox" effect, and is shown in FIG. 1.

FIG. 1 is a picture of a 16:9 aspect ratio picture displayed on a 4:3 aspect ratio television display. Displaying a 16:9 aspect picture on a 4:3 aspect ratio television creates a problem with respect to performing automatic digital convergence (also referred to as "auto-regi", "auto-focus" and "flash-focus") for the 16:9 aspect ratio picture. Automatic digital convergence (hereinafter referred to as "autoconvergence") performs the function of displaying patterns to assist in the adjustment of the picture on the television display screen. These patterns are detected by, for example, sensors 108, 110, 112 and 114, which are placed at the top, bottom, left and right of the television display screen, respectively. Each sensor is essentially a solar cell that converts light energy into electrical energy. To perform autoconvergence the displayed picture must at least meet or overlap the sensors. When a 16:9 aspect ratio picture is displayed on a 4:3 aspect ratio display, however, the top and bottom edges of the 16:9 aspect ratio picture do not meet or overlap the top and bottom sensors (108, 110). Therefore, no patterns can be displayed on the top and bottom sensors.

FIG. 2 is a picture of a 4:3 aspect ratio picture displayed on a 16:9 aspect ratio television display. Similar to the problem described with reference to FIG. 1, a problem occurs when a 4:3 aspect picture is displayed on a 16:9 aspect ratio television. More particularly, the vertical height of the 4:3 aspect picture matches the vertical height of the 16:9 aspect ratio television, but not the horizontal width. Consequently, black bands appear at the left and right sides of the television screen. Therefore, when a 4:3 aspect ratio picture is displayed on a 16:9 aspect ratio television screen, the left and right sides of the 4:3 aspect ratio picture do not meet or overlap the left and right sensors (112, 114). Therefore, no patterns can be displayed on the left and right sensors.

In view of the foregoing, it can be appreciated that a substantial need exists for a method and apparatus capable of displaying a 16:9 aspect ratio signal on a 4:3 aspect ratio television, and vice-versa, while also performing autoconvergence on the displayed picture.

SUMMARY OF THE INVENTION

One embodiment of the invention comprises a method and apparatus for performing autoconvergence. An image having a first aspect ratio and a plurality of sides is received. The image is displayed on a display having a second aspect ratio and at least one sensor corresponding to each side of the image. The image is moved so that each sensor can detect the corresponding side of the image.

With these and other advantages and features of the invention that will become hereinafter apparent, the nature of the invention may be more clearly understood by reference to the following detailed description of the invention, the appended claims and to the several drawings attached herein.

DETAILED DESCRIPTION

The embodiments of the invention include a method and apparatus for displaying an image having a first aspect ratio on a display having a second aspect ratio while also performing autoconvergence on the displayed picture. For example, a 16:9 aspect ratio image can be displayed on a 4:3 aspect ratio television while also performing autoconvergence on the 16:9 aspect ratio image. This is accomplished by moving the image on the display so that the image can be detected by autoconvergence sensors located on the four edges of the display. The movement of the image can be in the form of shifting the entire image towards the sensor, or alternatively, stretching the image so that the edges of the image can be detected by the sensors.

The embodiments of the invention perform autoconvergence by moving the image towards the sensors. Consequently, various points along the video signal path can serve as an implementation point. In one embodiment of the invention, a deflection signal is modified in accordance with signals or instructions from an image adjustment module (also referred to herein as an "image adjustor"). The deflection signal is received by the electron gun of the CRT and the image is modified accordingly.

It is worthy to note that the terms "top edge" and "bottom edge" of the 16:9 aspect ratio picture as used herein refer to the boundary line between the signal area (white area 106) and no signal area (black area 102) at the top and bottom of the 16:9 aspect ratio picture, respectively, or the beginning and end portions of the vertical deflection sweep used to display the 16:9 aspect ratio picture on a screen, respectively. The terms "left edge" and "right edge" of the 4:3 aspect ratio picture as used herein refer to the boundary line between the signal area (white area 206) and no signal area (black area 202) at the left and right of the 4:3 aspect ratio picture, respectively, or the horizontal end portions of the horizontal deflection sweep used to display the 4:3 aspect ratio picture on a screen.

It is also worthy to note that any reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
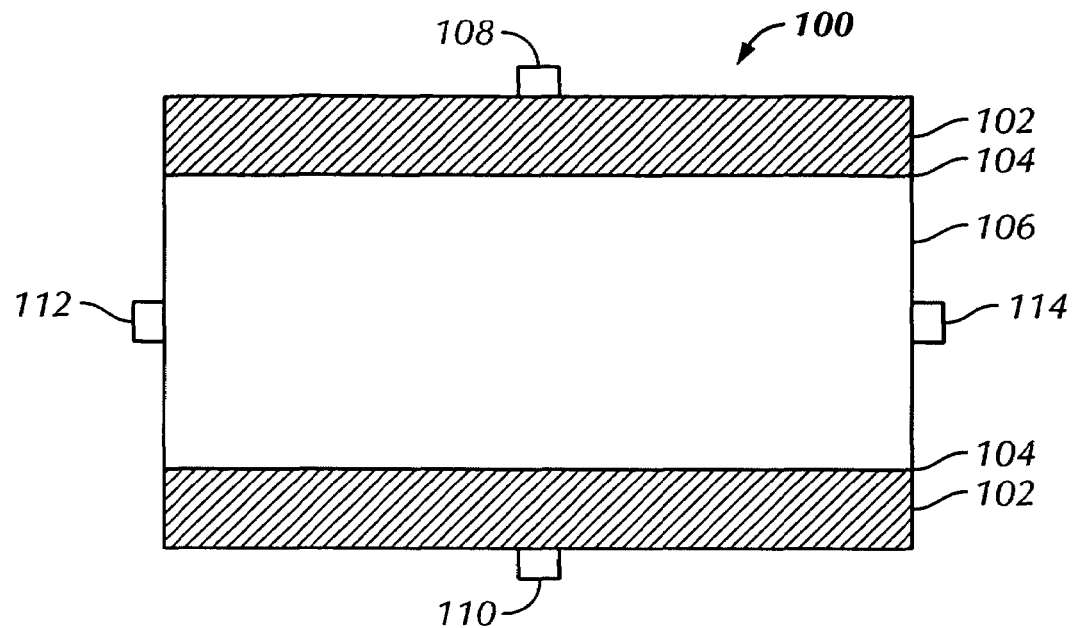
FIG. 1 is a picture of a 16:9 aspect ratio picture displayed on a 4:3 aspect ratio television display.
Figure 2:
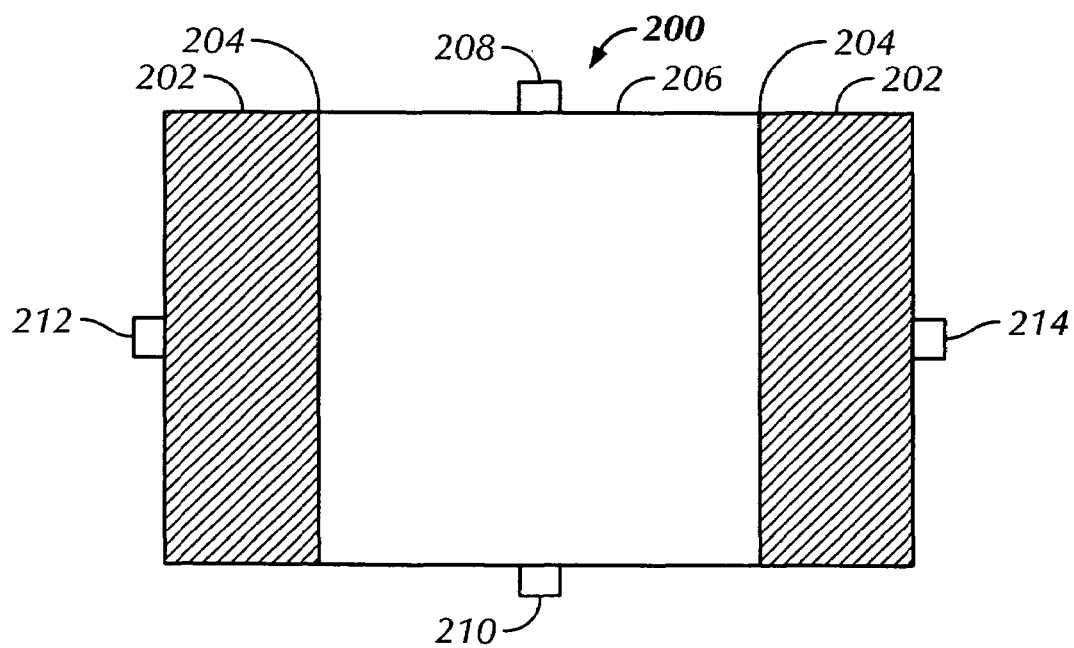
FIG. 2 is a picture of 4:3 aspect ratio picture displayed on a 16:9 aspect ratio television display.
Figure 3:
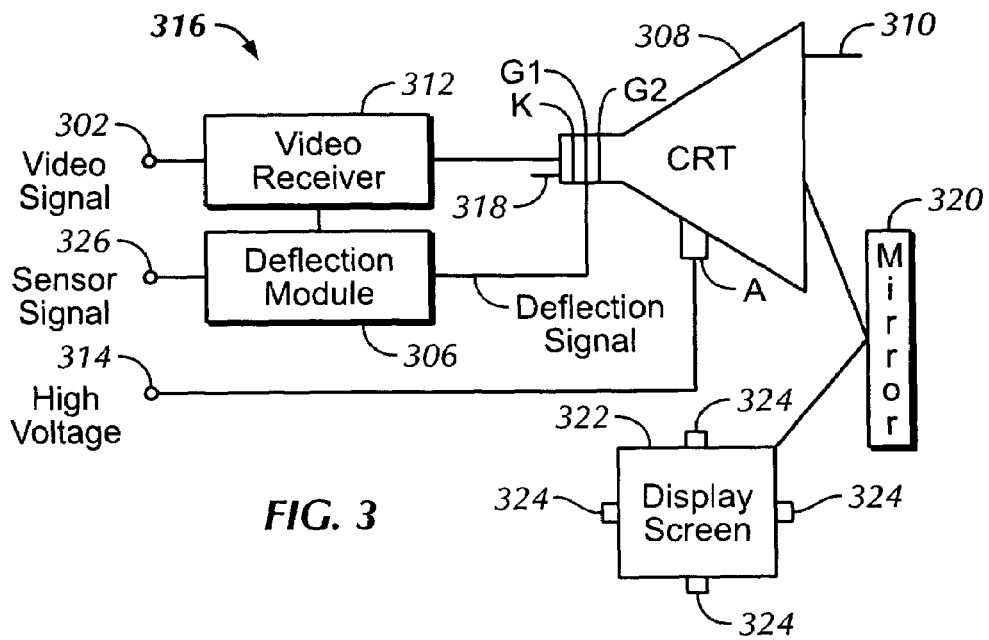
FIG. 3 is a block diagram of portions of a video display system in accordance with one embodiment of the invention.

Referring now in detail to the drawings wherein like parts are designated by like reference numerals throughout, there is illustrated in FIG. 3 portions of a video display system in accordance with one embodiment of the invention. The term "video display system" refers to a system capable of receiving and displaying video signals such as a television receiver equipped with a display system. As shown in FIG. 3, a video display system 316 comprises a video receiver 312, a deflection module 306, a CRT display system 308, a mirror 320 and a display screen 322. Display screen 322 is equipped with a plurality of autoconvergence sensors 324.

In this embodiment of the invention, video display system 316 is a large screen projection type television system. In large-sized projection type television receivers, electron beams are projected from three color CRTs (often referred to as red (R), green (G) and blue (B) projection tubes) via a mirror 320 towards a display screen 322 so that images are displayed thereon. Display screen 322 can be either a reflection-type screen or a projection-type screen. In this projection-type television system, the configuration of each R, G and B CRT display system is similar. For purposes of clarity, however, only a single CRT display system 308 is illustrated in FIG. 3 and discussed below, with the understanding that the remaining two CRT display systems will operate in substantially the same manner.

CRT display system 308 comprises an image-receiving tube with an electron gun 318 arranged in a neck portion of a funnel-shaped glass bulb, and an anode (A) and a fluorescent screen 310 are provided in a cone shaped portion of the glass bulb. An electron beam emitted from electron gun 318 is accelerated by an anode voltage of a high voltage from input 314 so as to impinge onto fluorescent screen 310, so that images are displayed thereon.

Electron gun 318 of CRT display system 308 contains a cathode (K) for emitting electrons, and a plurality of cylindrical electrodes, namely grids for converging the electrons emitted from the cathode into an electron beam and also for accelerating the electron beam. These grids are called the first grid (G1), the second grid (G2), and so forth, counting from the cathode side. CRT display system may also utilize a deflection yolk for converging the electrons emitted from the cathode (K). The deflection yolk is a coil of wire through which electricity is directed to create a magnetic filed. The magnetic filed is used to direct the electrons to the appropriate point on fluorescent screen 310.

Deflection module 306 is used to control distribution of the signal carrying the image across the phosphor of screen 310. In essence, the deflection module 306 controls whether the phosphor is lit for any one point on the display. Deflection module 306 receives signals from sensors 324, and uses the sensor signals to perform autoconvergence. Deflection module 306 then generates a deflection signal which is typically applied to one or more grids, or the deflection yolk, of the electron gun of CRT display system 308. Deflection module 306 will be discussed in more detail with reference to FIG. 4.

Figure 4:
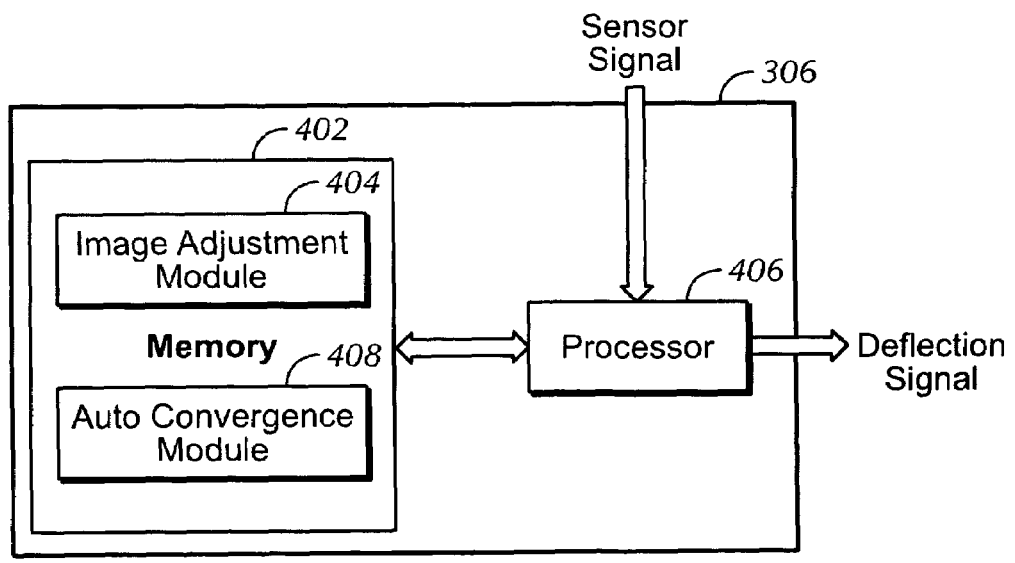
FIG. 4 is a block diagram of an image adjustment module in accordance with one embodiment of the invention.

FIG. 4 is a block diagram of a deflection module in accordance with one embodiment of the invention. As shown in FIG. 4, deflection module 306 comprises a memory 402 and a processor 406. Memory 402 contains an image adjustment module 404 and an autoconvergence module 408. Processor 406 comprises any processor capable of providing the speed and functionality of the embodiments of the invention. For example, processor 406 could include the Pentium® family of processors made by Intel Corporation, the 68XXX family of processors made by Motorola, an Application Specific Integrated Circuit (ASIC) or a Digital Signal Processor (DSP). For the purposes of this application, memory 402 is a machine readable medium that could include any medium capable of storing instructions adapted to be executed by a processor. Some examples of such media include, but are not limited to, read-only memory (ROM), random-access memory (RAM), programmable ROM, erasable programmable ROM, electronically erasable programmable ROM, dynamic RAM, magnetic disk (e.g., floppy disk and hard drive), optical disk (e.g., CD-ROM), and any other device that can store digital information. In one embodiment, the instructions are stored on the medium in a compressed and/or encrypted format. As used herein, the phrase "adapted to be executed by a processor" is meant to encompass instructions stored in a compressed and/or encrypted format, as well as instructions that have to be compiled or installed by an installer before being executed by the processor. Further, video display system 316 may contain various combinations of machine readable storage devices, that are accessible by processor 406 and which are capable of storing a combination of computer program instructions and data.

Memory 402 stores instructions that when executed by a processor (e.g., processor 406) performs the functionality for the various embodiments of the invention. In one embodiment of the invention, the instructions are separated into two separate modules referred to as image adjustment module 404 and autoconvergence module 408. It can be appreciated, however, that the functions performed by this module can be further separated into more modules, combined into a single module, or be distributed throughout the system, and still fall within the scope of the invention. Further, although this embodiment of the invention implements the functionality of these modules in software, it can be appreciated that the functionality of these modules may be implemented in hardware, software, or a combination of hardware and software, using well-known signal processing techniques.

Autoconvergence module 408 performs the autoconvergence function for this embodiment of the invention. Autoconvergence module 408 can be adapted for televisions of different screen sizes, resolutions, formats and so forth, as is well known in the art.

Image adjustment module 404 performs image adjustment to the image in cases where there are, for example, disparity in aspect ratios of the image and the display used to display the image. The disparity in aspect ratios prevents the image from meeting or overlapping one or more sensors. Image adjustment module 404 solves this problem by moving the image towards the sensor.

In one embodiment of the invention, the entire image is shifted from its original or initial position towards a first sensor. The image remains detectable by the sensor until the appropriate pattern used for autoconvergence can be detected. Once the sensor has sufficient readings, the image is shifted towards another sensor so that sensor can take the appropriate readings. This process continues until all sensors have taken their readings, at which time the image is moved back to its original position.

In another embodiment of the invention, the entire image is stretched so that the boundaries of the image matches the boundaries of the display. Once the sensors take the appropriate readings, the image is reduced back to its initial size.

As described herein, the term "shifting" means moving the entire image without increasing any of its dimensions. The term "stretching" means keeping the center of the image in its initial position and modifying one or both dimensions of the image, i.e., its vertical height and/or horizontal width.

Figure 5:
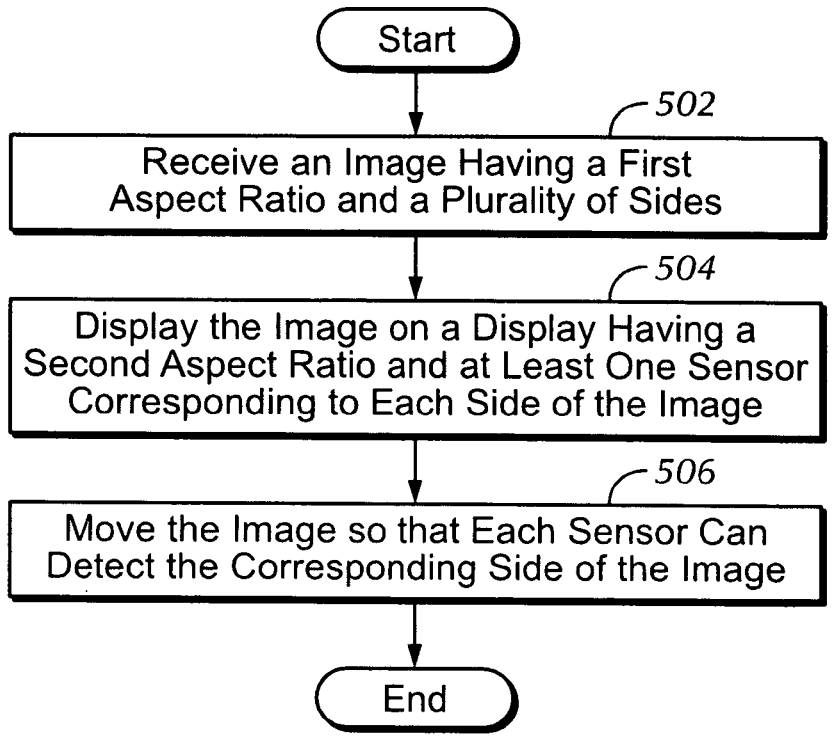
FIG. 5 is a block flow diagram of the steps performed by an image adjustment module in accordance with one embodiment of the invention.

FIG. 5 is a block flow diagram of the steps performed by an image adjustment module in accordance with one embodiment of the invention. As shown in FIG. 5, an image is received having a first aspect ratio and a plurality of sides at step 502. The image is displayed on a display having a second aspect ratio and at least one sensor corresponding to each side of the image at step 504. The image is moved so that each sensor can detect the corresponding side of the image at step 506.

Figure 6:
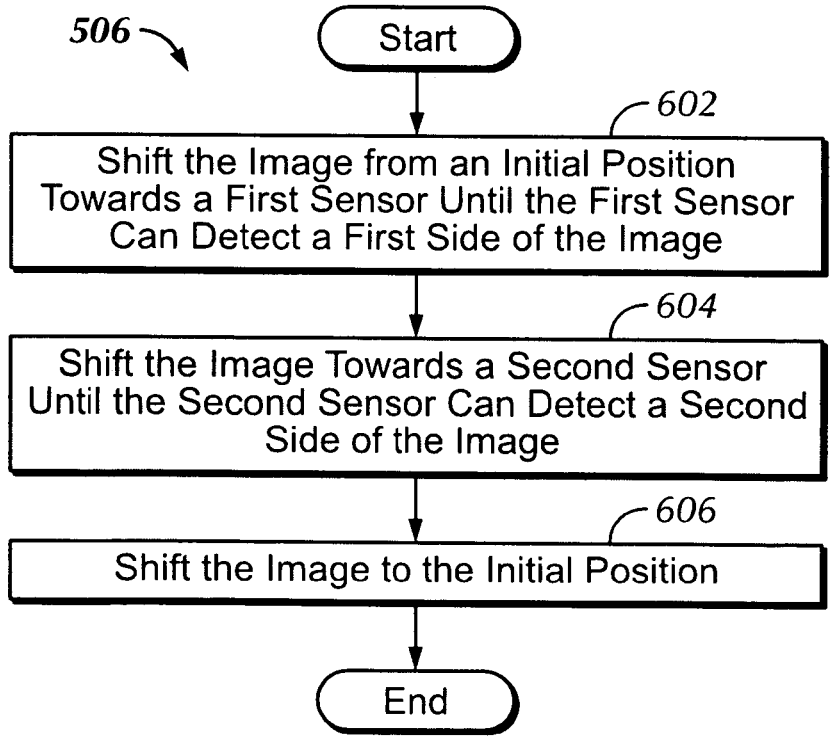
FIG. 6 is a block flow diagram of the steps performed in moving the image in accordance with one embodiment of the invention.

FIG. 6 is a block flow diagram of the steps performed in moving the image in accordance with one embodiment of the invention. Step 506 described with reference to FIG. 5 can be accomplished in any number of ways, two of which will be described with reference to FIGS. 6, 7, 8 and 9. As shown in FIG. 6, the image is shifted from an initial position towards a first sensor until the first sensor can detect a first side of the image at step 602. The image is then shifted towards a second sensor until the second sensor can detect a second side of the image at step 604. The image is then shifted to back to the initial position at step 604.

Figure 7:
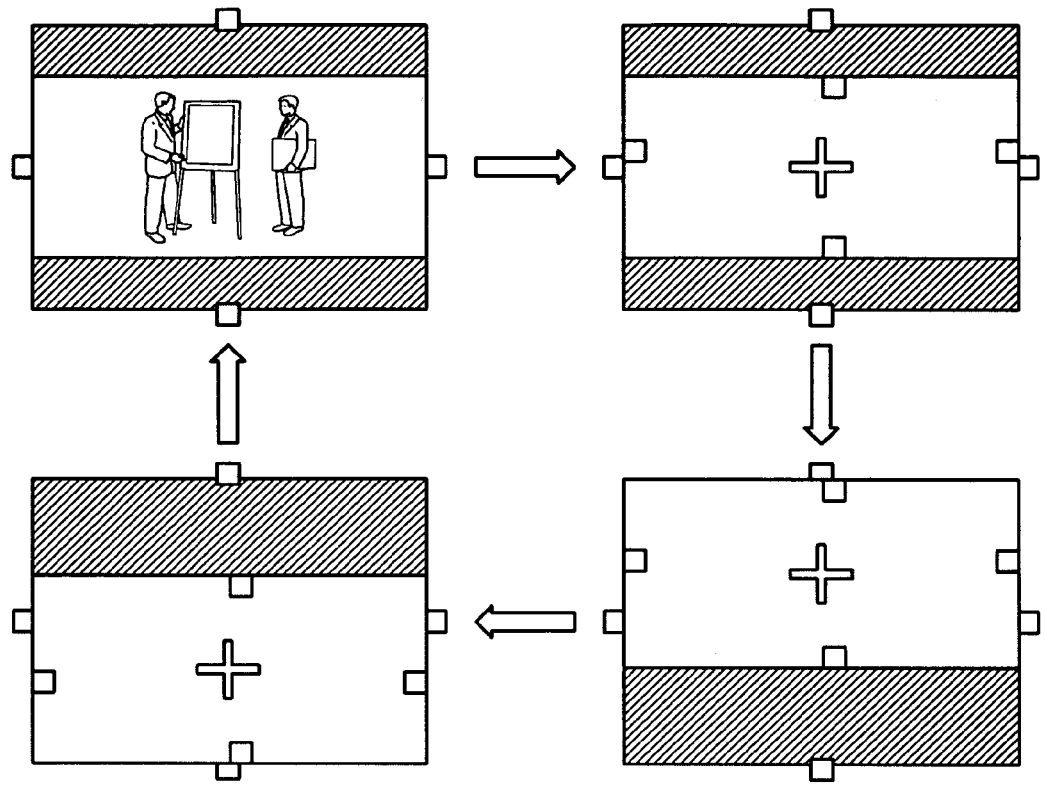
FIG. 7 is a picture of shifting the image in accordance with one embodiment of the invention.

FIG. 7 is a picture of shifting the image in accordance with one embodiment of the invention. The steps described with respect to FIG. 6 may be better understood by way of example using the pictures shown in FIG. 7. In this example assume that a 16:9 aspect ratio image is to be displayed on a 4:3 aspect ratio television display. The first sensor and second sensor could be, for example, a top sensor and bottom sensor, respectively. Further, the first side and the second side could be the top edge of the image and the bottom edge of the image. The image is shifted up from its initial position until the top edge of the image can be detected and measured by the top sensor. The image is then shifted down until the bottom edge of the image can be detected and measured by the bottom sensor. The image is then shifted back to its initial position. The autoconvergence is accomplished a minimal number of times, typically only once during the startup process of the television components, or alternatively as initiated by a viewer.

More particularly, the image adjustment module of the deflection module sends a signal to shift the vertical center of the image up until the image and sensor overlap, takes some measurements, then shifts the vertical center down until the bottom sensor is overlapped, takes some measurements, and then returns the vertical center to the original position. This is accomplished automatically with no interaction from the viewer necessary. Furthermore, this is accomplished at a speed that minimizes any delay in viewing the image.

Similar principles can be applied to a 4:3 aspect ratio image being displayed on a 16:9 aspect ratio display. The horizontal center can be shifted causing the raster to overlap one sensor at a time. Although there is more pincushion and linearity distortion introduced in this embodiment than the next embodiment described below, performance of the autoconvergence feature can be maintained through the use of conventional adjustment error measurement techniques.

Figure 8:
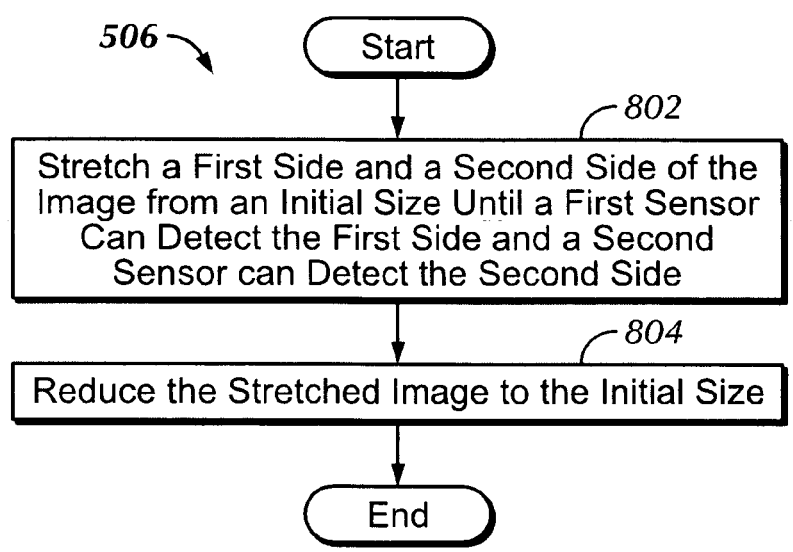
FIG. 8 is a block flow diagram of the steps performed in moving the image in accordance with another embodiment of the invention.

FIG. 8 is a block flow diagram of the steps performed in moving the image in accordance with another embodiment of the invention. As shown in FIG. 8, a first side and a second side of the image are both stretched from its initial size until a first sensor can detect the first side and a second sensor can detect the second side of the image at step 802. Once the image has been detected and measured by both sensors, the stretched image is reduced back to its initial size at step 804.

Figure 9:
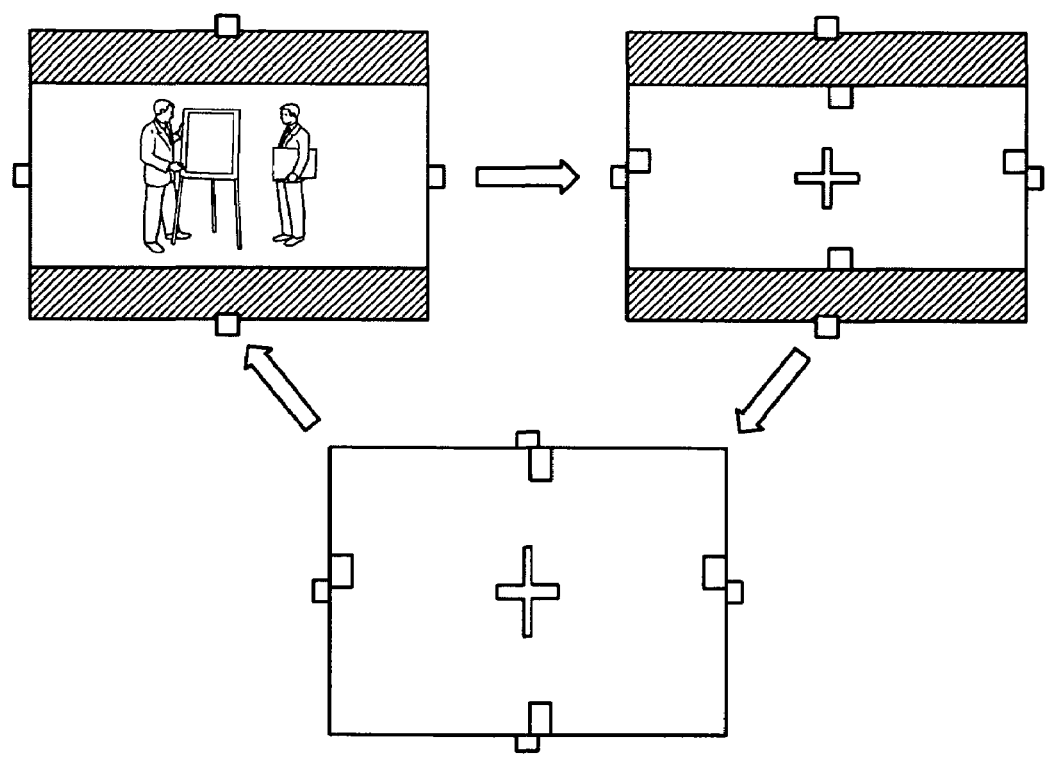
FIG. 9 is a picture of stretching the image in accordance with one embodiment of the invention.

FIG. 9 is a picture of stretching the image in accordance with one embodiment of the invention. The steps described with respect to FIG. 8 may be better understood by way of example using the pictures shown in FIG. 9. In this example assume the image is a 16:9 aspect ratio image displayed on a 4:3 aspect ratio display. The first sensor and second sensor could be, for example, a top sensor and bottom sensor, respectively. Further, the first side and the second side could be the top edge of the image and the bottom edge of the image. The image is stretched from its initial size until the top edge of the image can be detected and measured by the top sensor, and the bottom edge of the image can be detected and measured by the bottom sensor. Once the proper measurements have been taken, the image is then reduced back to its initial size. As described previously, this process occurs automatically once power is applied to the television. Furthermore, it is accomplished a minimal number of times, typically only once during the startup process of the television components.

More particularly, the vertical size of the 16:9 aspect ratio image is increased so that the scan area overlaps the autoconvergence sensors. This can be accomplished, for example, by increasing the vertical deflection sawtooth amplitude adjustment, which is currently controlled digitally. More particularly, the digital data for size is increased prior to the sensors beginning the measurement process and adjusting image convergence. Once the convergence process is completely, the digital data for size is returned to their original values. It is worthy to note that although increasing the vertical size of the image causes vertical pincushion and vertical keystone distortion, the autoconvergence sensors still operate within tolerable parameters. The performance stability comes through the use of conventional adjustment error measurement techniques.

Similarly, the same principles can be applied in the case of 4:3 aspect ratio image displayed on a 16:9 aspect ratio display. The horizontal size can be increased causing the raster to overlap the sensors. Although there is some pincushion and linearity distortion introduced by increasing horizontal size, the autoconvergence mechanism can compensate using the conventional adjustment error measurement techniques discussed above.

Determining how much the image should be shifted or stretched in accordance with the embodiments of the invention can be accomplished in any number of ways. For example, in one embodiment of the invention the image is shifted or stretched by measuring a first vertical height and a horizontal width for a television display. A digital step is defined for the television display. A distance is determined between each side and each sensor. A number of digital steps is determined corresponding to the distance. Finally, the image is shifted or stretched using the determined number of digital steps.

For example, determining an amount to shift or stretch the image can be performed using the following steps:

1. VS2=(VS1×16)/HS
2. VS3=VS2−VS1
3. VS4=VS3/2
4. NS=VS4/Step where VS1 is the vertical size of the display, HS is the horizontal size of the display, VS2 is the vertical size of the 16:9 picture, Step is a predefined number of centimeters/step, and NS is the number of steps to shift or stretch the image. Thus, if VS4=10 centimeters, and Step=0.5 centimeters, then NS would equal 20 steps.

Although various embodiments are specifically illustrated and described herein, it will be appreciated that modifications and variations of the present invention are covered by the above teachings and within the purview of the appended claims without departing from the spirit and intended scope of the invention. For example, although video display system 316 is described above as a large screen projection type television, it can be appreciated that video display system 316 could be a typical color television having a single CRT display system 308, and still fall within the scope of the invention. In other words, the video display systems 316 would not have three CRT display systems 308, respectively, with each representing R, G and B, but rather have a single CRT display system 308 with three electron guns (R, G and B) that operate in substantially the same manner as described above with respect to CRT display system 308. In such an embodiment, it would also not be necessary to have mirror 320 or display screen 322. In another example, although processor 406 is shown as part of deflection module 306, it can be appreciated that processor 406 can appear anywhere in the video signal processing path and still fall within the scope of the invention. For example, processor 406 is often part of the projection engine ("PJ Engine") of a projection television. The PJ Engine performs the function of "registration" or aligning the three beams (R, G and B) of a projection television.

What is claimed is:

1. A method for performing autoconvergence, comprising:
   receiving an image having a first aspect ratio and a plurality of sides;
   displaying said image on a display having a second aspect ratio and at least one sensor corresponding to each side of said image;
   moving said image as a single entire image, without increasing any of the dimensions of said image, so that each sensor can detect said corresponding side of said image.

2. The method of claim 1, wherein said first aspect ratio is a 16:9 aspect ratio and said second aspect ratio comprises a 4:3 aspect ratio.

3. The method of claim 2, wherein said image has a top side and a bottom side and said display has a top sensor and a bottom sensor, wherein said moving comprising moving said image so that said top sensor can detect said top side, and said bottom sensor can detect said bottom side.

4. The method of claim 1, wherein said first aspect ratio is a 4:3 aspect ratio and said second aspect ratio comprises a 16:9 aspect ratio.

5. The method of claim 4, wherein said image has a left side and a right side, and said display has a left sensor and a right sensor, wherein said moving comprising moving said image so that said left sensor can detect said left side, and said right sensor can detect said right side.

6. The method of claim 1, wherein said moving comprises:
   shifting said single entire image from an initial position towards a first sensor until said first sensor can detect a first side of said image;
   shifting said single entire image towards a second sensor until said second sensor can detect a second side of said image; and
   shifting said single entire image to said initial position.

7. The method of claim 6, wherein shifting said image from an initial position towards a first sensor comprises:
   measuring a first vertical height and a horizontal width for said display;
   defining a digital step, indicating a predefined number of centimeters per step, for said display;
   determining a distance between said first side and said first sensor using the measurements obtained in said measuring step;
   determining a number of digital steps corresponding to said distance; and
   shifting said image said number of digital steps.

8. A machine-readable medium whose contents cause a computer system to perform autoconvergence by performing the acts of:
   receiving an image having a first aspect ratio and a plurality of sides;
   displaying said image on a display having a second aspect ratio and at least one sensor corresponding to each side of said image;

moving said image as a single entire image, without increasing any of the dimensions of said image, so that each sensor can detect said corresponding side of said image.

9. The machine-readable medium of claim 8, wherein said first aspect ratio comprises a 16:9 aspect ratio and said second aspect ratio comprises a 4:3 aspect ratio.

10. The machine-readable medium of claim 9, wherein said image has a top side, a bottom side, a left side and a right side, and said display has a top sensor and a bottom sensor, with said moving comprising moving said image so that said top sensor can detect said top side, and said bottom sensor can detect said bottom side.

11. The machine-readable medium of claim 9, wherein said image has a top side, a bottom side, a left side and a right side, said display has a left sensor and a right sensor, with said moving comprising moving said image so that said left sensor can detect said left side, and said right sensor can detect said right side.

12. The machine-readable medium of claim 8, wherein said first aspect ratio comprises a 4:3 aspect ratio and said second aspect ratio is comprises a 16:9 aspect ratio.

13. The machine-readable medium of claim 8, wherein said moving comprises:

shilling said single entire image from an initial position towards a first sensor until said first sensor can detect a first side of said image;

shifting said single entire image towards a second sensor until said second sensor can detect a second side of said image; and shifting said single entire image to said initial position.

14. The machine-readable medium of claim 13, wherein shifting said image from an initial position towards a first sensor comprises:

measuring a first vertical height and a horizontal width for said display;

defining a digital step, indicating a predefined number of centimeters per step, for said display;

determining a distance between said first side and said first sensor using the measurements obtained in said measuring step;

determining a number of digital steps corresponding to said distance; and shifting said image said number of digital steps.

15. A method comprising:

displaying an image having a first aspect ratio on a display having a second aspect ratio, said first and second aspect ratios being different, said display comprising a first sensor positioned at a first side and a second sensor positioned at a second side opposite said first side; and moving said image as a single entire image, without increasing any of the dimensions of said image, so that said first and second sensors detect said image.

16. The method of claim 15, wherein said first aspect ratio is a 16:9 aspect ratio and said second aspect ratio comprises a 4:3 aspect ratio.

17. The method of claim 16, wherein said image has a top side and a bottom side, and said display has a top sensor and a bottom sensor, wherein said moving comprising moving said image so that said top sensor can detect said top side, and said bottom sensor can detect said bottom side.

18. The method of claim 15, wherein said first aspect ratio is a 4:3 aspect ratio and said second aspect ratio comprises a 16:9 aspect ratio.

19. The method of claim 18, wherein said image has a left side and a right side, and said display has a left sensor and a right sensor, wherein said moving comprising moving said image so that said left sensor can detect said left side, and said right sensor can detect said right side.

* * * * *

UNITED STATES PATENT AND TRADEMARK OFFICE
CERTIFICATE OF CORRECTION

PATENT NO. : 7,061,552 B1
APPLICATION NO. : 09/493917
DATED : June 13, 2006
INVENTOR(S) : Chris Warren Patten et al.

It is certified that error appears in the above-identified patent and that said Letters Patent is hereby corrected as shown below:

Col. 1, line 20, before last word "high", change "exceptional", to -- exceptionally --.

Col. 5, line 5, after "of", change "machine readable" to -- machine-readable --.

Col. 6, line 7, after first word "shifted", delete "to".

Col. 7, line 13, before "the", change "completely" to -- completed --.

Claim 3, Col. 8, line 28, before last word "moving", change "comprising" to

-- comprises --.

Claim 5, Col. 8, line 36, after "moving", first occurrence, change "comprising" to -- comprises --.

Signed and Sealed this

Fifth Day of December, 2006

JON W. DUDAS
*Director of the United States Patent and Trademark Office*

UNITED STATES PATENT AND TRADEMARK OFFICE
CERTIFICATE OF CORRECTION

PATENT NO. : 7,061,552 B1
APPLICATION NO. : 09/493917
DATED : June 13, 2006
INVENTOR(S) : Chris Warren Patten et al.

It is certified that error appears in the above-identified patent and that said Letters Patent is hereby corrected as shown below:

Col. 1, line 20, before last word "high", change "exceptional", to -- exceptionally --.

Col. 5, line 5, after "of", change "machine readable" to -- machine-readable --.

Col. 6, line 7, after first word "shifted", delete "to".

Col. 7, line 13, before "the", change "completely" to -- completed --.

Claim 3, Col. 8, line 28, before last word "moving", change "comprising" to

-- comprises --.

Claim 5, Col. 8, line 36, after "moving", first occurrence, change "comprising" to -- comprises --.

Claim 13, Col. 9, line 25, change first word "shilling" to -- shifting --.

Claim 17, Col. 10, line 24, after "moving", (first occurence), change "comprising"

to -- comprises --.

UNITED STATES PATENT AND TRADEMARK OFFICE
CERTIFICATE OF CORRECTION

PATENT NO. : 7,061,552 B1
APPLICATION NO. : 09/493917
DATED : June 13, 2006
INVENTOR(S) : Chris Warren Patten et al.

It is certified that error appears in the above-identified patent and that said Letters Patent is hereby corrected as shown below:

Claim 19, Col. 10, line 32, after "moving", (first occurence), change "comprising" to -- comprises --.

Signed and Sealed this

Seventeenth Day of April, 2007

JON W. DUDAS
*Director of the United States Patent and Trademark Office*